INVENTORS
TADASHI KAWAI
HIDEAKI KENMA

United States Patent Office 3,725,043
Patented Apr. 3, 1973

3,725,043
METHOD FOR SEGREGATING METALS CONTAINED IN THE OXIDE ORES THEREOF
Tadashi Kawai and Hideaki Kenma, Tokyo, Japan, assignors to Mitsui Mining & Smelting Co., Ltd., Tokyo, Japan
Filed Feb. 26, 1971, Ser. No. 119,101
Claims priority, application Japan, May 26, 1970, 45/44,492
Int. Cl. C21c 7/00
U.S. Cl. 75—72
9 Claims

ABSTRACT OF THE DISCLOSURE

A method for obtaining a concentrated metal-containing product from metal oxide ore wherein the oxide ore is preheated in a preheating zone and the preheated ore is contacted with a halogenating agent and a reducing agent in a reaction zone to react therewith, in which oxide ore is flowed through a preheating zone consisting of at least two cyclones connected in series, parallel or combinations thereof, passing a hot gas free of any exhaust gas from the reaction zone in surface contact with said oxide ores in the preheating zone, flowing continuously the thus preheated ores into the reaction zone while substantially preventing the atmosphere of the preheating zone from entering the reaction zone and withdrawing the exhaust gas generated in the reaction zone therefrom.

BACKGROUND OF THE INVENTION (a) Field of the invention

The present invention relates to an improved method of segregating and recovering metals by reacting ores of oxides of metals, such as copper, nickel, etc., with a halogenating agent and a reducing agent, which is characterized by a preheating zone for said oxide ores consisting of a plurality of cyclones combined with a reaction zone free of the atmosphere of said preheating zone. In the reaction zone, the ores are reacted with additives so as to effect metal-segregation reaction.

(b) Description of the prior art

In order to segregate, in a metallic form on the solid reducing agent, metals, such as gold, silver, copper, iron, nickel, cobalt, gallium, platinum and bismuth, etc., contained in oxide ores or metallurgical products, it has been popular to employ a process in which said ores or metallurgical products (hereinafter referred to as oxide ores) are heated at a specified temperature in the presence of a halogenating agent together with a reducing agent within a rotary furnace or a fluid bed furnace maintained under a neutral atmosphere or under a weakly reductive atmosphere so as to effect a reaction between the oxide ores and these reactants. Suitable halogenating agents include inorganic halogenides of alkali metal, alkaline earth metal or ammonia such as, for instance, sodium chloride, calcium chloride, calcium fluoride, ammonium chloride, etc. Suitable reducing agents include such carbonaceous materials as coke, coal, charcoal, etc.

In this connection, however, when the segregation process is effected industrially, it is essential that the following three requirements be met:

(1) Heating the oxide ores to the desired temperature at a high thermal efficiency.

(2) Maintaining the reaction atmosphere neutral or weakly reductive.

(3) Ensuring the appropriate handling of the exhaust gas containing chlorine, hydrogen chloride, etc., generated in the reaction zone.

The method of metal segregation in the prior art comprising the foregoing steps of heating the oxide ores at a desired temperature using a rotary furnace on a fluid bed furnace and mixing additives necessary for effecting reaction with the ores in advance or upon heating thereof to thereby give rise to the segregation reaction has such drawbacks that the thermal efficiency is not only uneconomically low due to the shape of the furnace employed, but also the maintaining of the reaction atmosphere neutral or weakly reductive is difficult because it is impossible to prevent the combustion gas used for heating from entering the reaction atmosphere. Besides, it involves the further problem that large amounts of harmful corrosive gases generated by the reaction flow inside of the equipment.

To illustrate the method of effecting the metal segregation reaction by employing a fluid bed furnace according to the prior art as illustrated in FIG. 2 of the attached drawings, the oxide ores to be treated are introduced into a fluid bed heating zone 22 by means of a stock feed duct 29 and the heating zone is heated by combustion of a powdered fuel simultaneously fed through a fuel feed duct 30. The reference numeral 31 indicates an inlet for the air necessary for effecting the combustion. The thus preheated oxide ores are sent through a heating zone space 34 and a flue 28, collected by cyclones 26 and 27, and then are introduced into a reaction zone 23. The preheated ores sent into the reaction zone 23 are reacted with a halogenating agent as well as a reducing agent fed through the respective hoppers 24 and 25, and, upon completion of the reaction, the products are taken out through a discharger 33 to be flowed to subsequent processing steps.

According to the foregoing method, the exhaust gas coming out of the top of the cyclone 27 retains a high temperature substantially the same as that of the heating zone. The employment of the foregoing equipment alone is bound to lower the efficiency, so that the thermal recovery of waste heat must be considered. Moreover, because the heating zone space 34 and the upper part of the reaction zone 23 are interconnected by the duct 32, the atmosphere of the reaction zone is apt to be detrimentally affected by the combustion gas of the heating zone and, also, harmful gases containing chlorine, hydrogen chloride, etc., generated in the reaction zone are mixed with the exhaust gas. Such being the case, under the conventional method, it has been necessary to provide large-size equipment for eliminating these harmful gases. Moreover, in the heating zone, coarse grains are apt to be retained in the fluid layer while fine grains are apt to be flowed to the cyclones due to the so-called classification effect, thereby making it infeasible to effect uniform heating of the oxide ores, causing excessive preheating of the coarse grains or the like, and bringing about a bad effect on the segregation reaction. Further, there are such additional troubles as the mixing of the oxide ores and the additives is apt to be insufficiently effected in the reaction zone, and the kind of fuel for use in heating is limited to powdered fuel such as pulverized coal, and so forth.

BRIEF DESCRIPTION OF THE DRAWINGS

In the attached drawings, FIG. 1 and FIG. 3, each are an illustration of a system embodying the present invention.

SUMMARY OF THE INVENTION

The object of the present invention is to provide a method for segregating the metals contained in the oxide ores in order to eliminate the afore-mentioned troubles wherein the oxide ores are preheated in a preheating zone, and the preheated ores are contacted with both a halogenating agent and a reducing agent in a reaction zone to react therewith. The method of the invention comprises the steps of introducing the oxide ores into a preheating zone consisting of at least two cyclones, said cyclones being connected in series, parallel or a combination of series and parallel, wherein a hot gas blast free of any exhaust gas from the reaction zone is passed in surface contact with said ores, feeding continuously the thus preheated ores into the reaction zone while preventing the atmosphere of the preheating zone from entering the reaction zone, and withdrawing from the reaction zone the exhaust gas generated therein.

In the method according to the present invention, the harmful gas generated in a small amount in the reaction zone is not permitted to pass into the preheating zone, but, rather, is disposed of by another system. The reaction zone is so devised as to perform a uniform mixing of the oxide ores and the additives by employing a rotary type furnace such as a rotary kiln.

As for the cyclones used in the preheating zone, it is suitable to use cyclones which are capable of smoothly effecting heat-exchange between the ores and the combustion gas in the form of hot gas blast and efficiently heating the ores.

Figure 1:
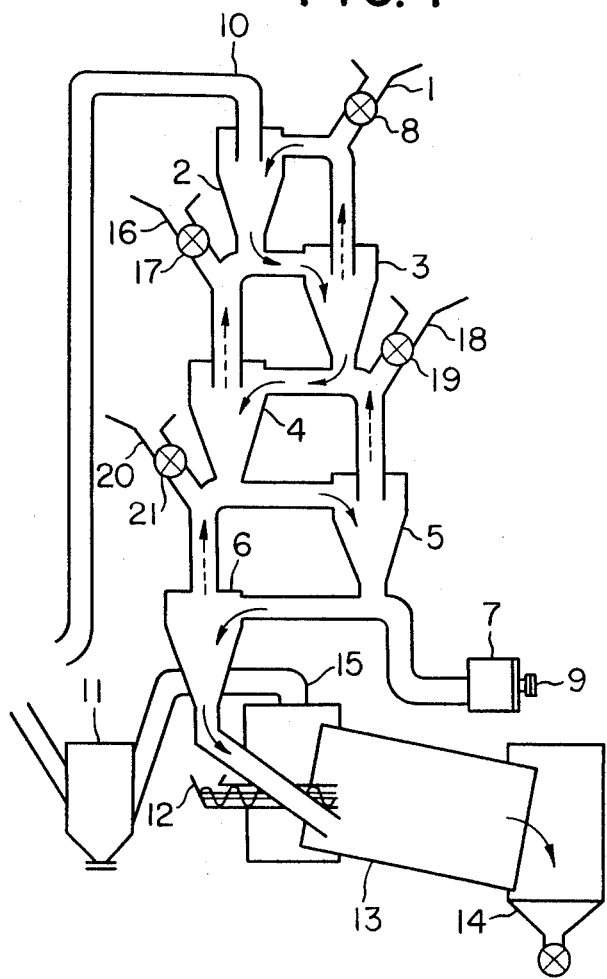
Figure 2:
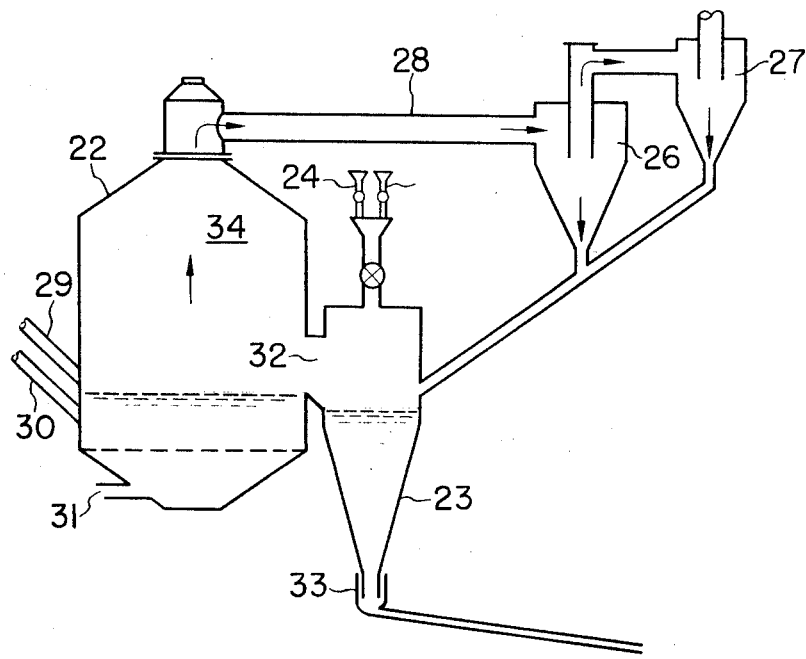
FIG. 2 is an illustration of a conventional system employing a fluid bed furnace.

FIG. 1 illustrates one embodiment according to the present invention, in which cyclones are arranged in series. The oxide ores are fed from a hopper 1 into the first cyclone 2 by way of a feeder 8 together with the combustion gas flowing up from the second cyclone 3. The ores descend from the first cyclone 2 into the second cyclone 3 together with gas flowing up from the third cyclone 4 while effecting heat exchange with each other. Subsequently, in like manner, the ores flow from the third cyclone 4 to the fourth cyclone 5 and the fifth cyclone 6 in sequence, to be thereby preheated up to a preselected temperature. The preselected preheating temperature may be varied depending on the kinds of the oxide ores employed. (For instance, in case of copper ore, it is in the range of from 700° to 850° C.) Meanwhile, a combustion gas flowing from a hot gas generator 9 flows into a combustion chamber 7 in the form of hot blast and thereafter flows in the fifth cyclone 6 while simultaneously heating the ores descending from the fourth cyclone 5. Subsequently, in like manner, the combustion gas flows round to the fourth cyclone 5, the third cyclone 4, the second cyclone 3 and the first cyclone 2, in order to thereby heat the ores, and finally is discharged through a flue 10. The thus preheated ores subsequently flow in a rotary kiln-type reaction zone 13 in which, if desired, the ores may be heated more, and, upon effecting the segregation reaction with a halogenating agent and a reducing agent fed from a hopper 12, are discharged to a discharge receptacle 14. The exhaust gas generated in the reaction zone 13 is fed into a flue 15, and, after being cleansed of harmful gas in a tower 11, is discharged.

The numerals 16, 18 and 20 are auxiliary hoppers for holding additional ore supplies and these hoppers are equipped with feeders 17, 19 and 21. The auxiliary hoppers can be used, if desired, to feed ore into various locations in the ore flow path, for example, when it is desired to pass the ore through less than five cyclones.

The foregoing description pertains to the embodiment of the present invention employing five cyclones wherein the combustion gas coming from the hot blast generator 9 is blown into the fifth cyclone 6 from the lower part of the fourth cyclone 5. The number of the cyclones used is variable and may be determined appropriately within the range of preferably from three to five cyclones. In this connection, the hot gas blast may be directed immediately into the last cyclone or into another cyclone instead of passing through, in order, the cyclones as described in the present embodiment.

A suitable temperature of the hot gas generated by this type of apparatus is within a range of from 800° to 1300° C. and varies with the number of cyclones in the preheating zone, the kind and quality of the oxide ores employed therein, and the temperature required in the reaction zone. However, in general, it is preferable that the temperature of the entering hot gas from the combustion chamber 7 should be 800–1,100° C., in case of segregation of the coinage metals group, such as copper, silver, and gold, and 950–1,300° C., in case of segregation of the heavy metals group such as nickel, cobalt, iron, gallium and platinum.

With respect to the reducing agent, the amount to be employed in the present invention is variable depending on the kind of oxide ores fed in. As a general rule, it should be 0.5 to 10% by weight of the ores. The halogenating agent should be employed normally in an amount of 0.1 to 1.0% by weight of the ore, in the case of segregation for copper, silver and gold, and in an amount of 3–15% by weight of the ore in the case of segregation for nickel, cobalt, iron, etc.

For the segregation of gold, silver or copper, the temperature in the reaction zone should be kept within the range of 600–850° C., while for the segregation of nickel, cobalt or iron, the reaction zone temperature should be within the range of 900–1,200° C.

These conditions and the amounts of the reactants added are well known in the art.

Figure 3:
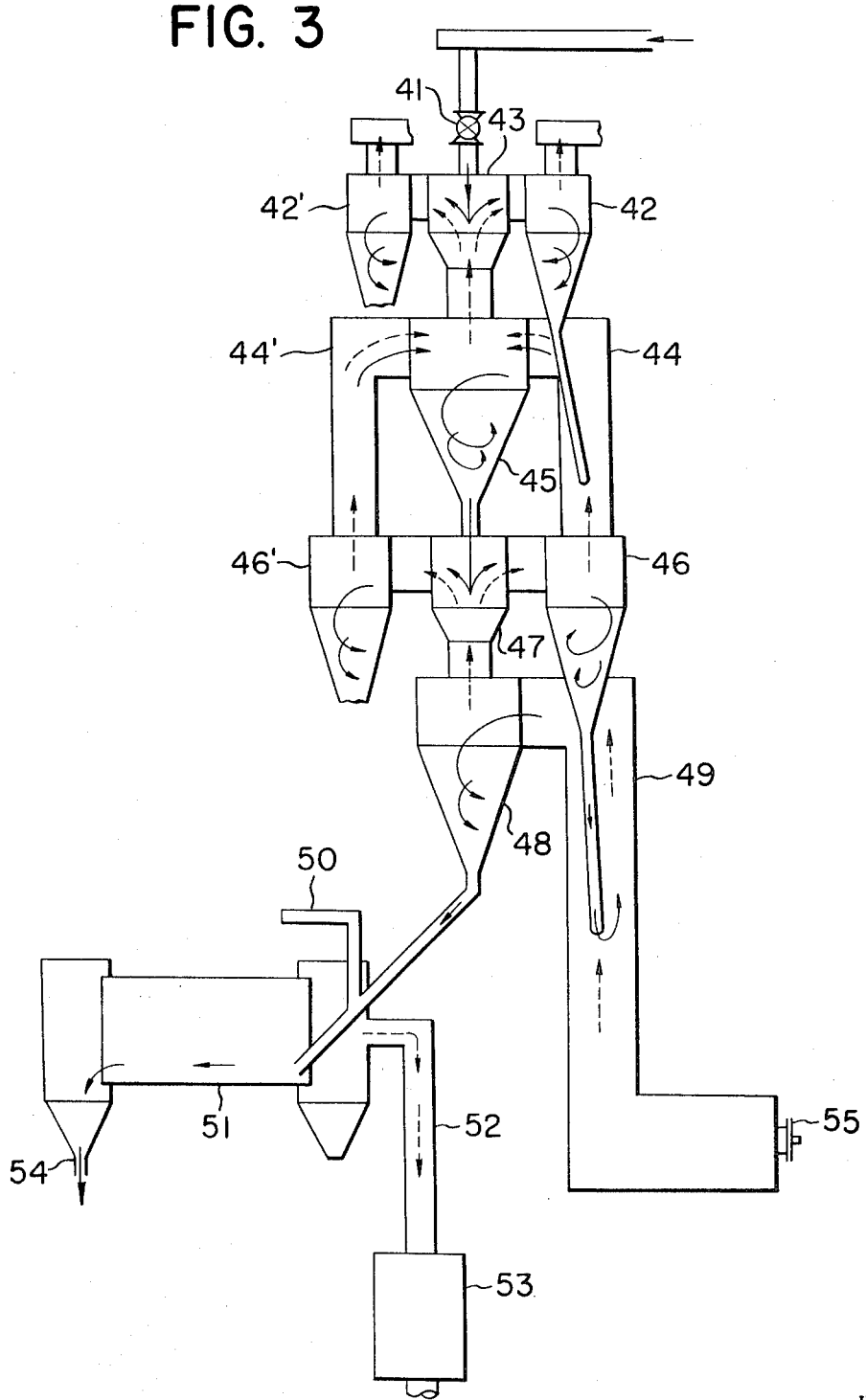

FIG. 3 illustrates another embodiment of the present invention, in which cyclones are arranged in parallel. In this case, the ores are fed by way of a feeder 41, and subsequent to reaching the vortex chamber 43, are introduced into the cyclones 42 and 42' connected to the both sides of the chamber 43, along with the ascending combustion gas. The ores after being separated from the gas in the cyclones 42 and 42' descend and flow into the flues 44 and 44' respectively (for example, the ores descending from the cyclone 42' flow into the flue 44'), and subsequently flow into the cyclone 45 together with the combustion gas ascending through the flues 44 and 44'. In like manner thereafter, the ores flow through the vortex chamber 47, cyclones 46 and 46', flue 49 (into which the ores from the cyclone 46' also flow) and cyclone 48 in that order and then reach the reaction zone 51 while being heated by the combustion gas. Within this reaction zone 51 the ores are made to react with the additives supplied from the feeder 50 and are thereafter discharged through the outlet 54 to be subjected to the conventional metal-separation (flotation) process subsequent thereto.

On the other hand, the combustion gas produced in the hot gas generator 55 ascends through the flue 49 and enters the cyclone 48 while effecting heat-exchange with the descending ores, and, after being once separated from the ores therein, enters the vortex chamber 47. Subsequently, this gas enters the cyclones 46 and 46' together with the ores falling into the vortex chamber 47. In like manner, the gas goes through the flues 44 and 44', cyclone 45, vortex chamber 43, cyclones 42 and 42' in sequence and is discharged thereafter. In this connection, the numeral 52 denotes the flue for the exhaust gas arising from the reaction, and the numeral 53 denotes a scrubbing tower for cleansing said exhaust gas.

The number of stages of cyclones employed in the present embodiment is four, i.e. (1) cyclones 42 and 42', (2) cyclone 45, (3) cyclones 46 and 46' and (4) cyclone 48, but it will also do to employ such even-numbered stages as, say, two stages, six stages, etc. As to the number of cyclones adjoined to the one or both sides of the vortex chambers 43 and 47, it is not limited to two; it suffices to be one or more, and besides, it is not necessary that each vortex chamber be provided with the same number of cyclones. The number of flues may also be varied as in the case of the cyclones. However, the number of stages of the cyclones in the case of parallel disposition is preferably 2, 4 or 6 and the number of cyclones adjoined to the sides of the vortex chamber is normally plural. In any case, the conditions of reaction, the amount of reactants, etc., are the same as when the cyclones are connected in series.

Moreover, the present invention can be practiced not only by disposing the cyclones in series or in parallel, but also by means of various modifications or combination of these dispositions. And, how to dispose or combine these cyclones is well known to workers skilled in this art.

The present invention has a number of advantages, such as:

(1) The heat exchange between the combustion gas and the oxide ores is carried out efficiently, so that a satisfactory thermal efficiency can be obtained;

(2) The atmosphere for the segregation reaction is determined by the reducing agent only, and, therefore, the maintenance of an appropriate atmosphere is quite easy;

(3) Inasmuch as the harmful exhaust gas containing chlorine, hydrogen chloride, etc., generated in the reaction zone is disposed of by another system without being permitted to pass through the preheating zone, the portions of the equipment apt to be corroded by such exhaust gas are limited, and, moreover, because the amount of the harmful exhaust gas coming out of the reaction zone is small, the equipment for eliminating it can be of a small size;

(4) The oxide ores and the reactants are thoroughly mixed so as to effect a uniform reaction; and (5) The ores are uniformly heated without being overheated.

PREFERRED EMBODIMENTS OF THE INVENTION

The following are illustrative examples of the invention.

Example 1

Copper oxide ore from South America (Au content: 3.5 g./t., Ag content: 22 g./t., Cu content: 5.4%) which was ground to a size of —35 mesh, was continuously fed into the hopper 1 of an apparatus as shown in FIG. 1, said apparatus being provided with a preheating zone consisting of five cyclones 2, 3, 4, 5 and 6 under the below-mentioned conditions:

Interior temperature of the cyclone 2—250° C.
Interior temperature of the cyclone 3—320° C.
Interior temperature of the cyclone 4—390° C.
Interior temperature of the cyclone 5—450–460° C.
Interior temperature of the cyclone 6—780–810° C.
Temperature of the hot gas in the combustion chamber 7—1,000° C.
Temperature of the rotary kiln-type reaction zone 13—780–790° C.
Amount of added sodium chloride—0.8% (by weight of said ore).
Amount of added coke—3.0% (by weight of said ore).

Thus obtained products were subjected to a conventional flotation process. The result was as follows:

Weight of recovered Cu-concentrate—8.3% (by weight of said ore fed in).

Analysis:
    Au content: 31 g./t., Au recovery: 75%.
    Ag content: 233 g./t., Ag recovery: 88%.
    Cu content: 58%, Cu recovery: 89%.

Example 2

Garnierite from New Caledonia (Ni content: 2.92%), which was ground to a size of —35 mesh, was continuously fed into the hopper 16 of the cyclone 4, as shown in FIG. 1, (using four cyclones, that is, the cyclones 3, 4, 5 and 6) under the below-mentioned conditions:

Interior temperature of the cyclone 3—320° C.
Interior temperature of the cyclone 4—400–450° C.
Interior temperature of the cyclone 5—650–700° C.
Interior temperature of the cyclone 6—950–1,000° C.
Temperature of the hot gas in the combustion chamber 7—1,200° C.
Temperature of the rotary kiln-type reaction zone 13—940–980° C.
Amount of added calcium chloride—10% (by weight of said ore).
Amount of added coke—3% (by weight of said ore).

Thus obtained products were subjected to a conventional flotation process. The result was as follows:

Weight of recovered Ni-concentrate—7.6% (by weight of the fed-in ore).

Ni content: 32%, Ni recovery: 83%.

Example 3

Copper oxide ore from Australia (Cu content: 3.5%), which was ground to a size of —48 mesh after water-washing for removal of slime, was continuously fed into the hopper 18 of the cyclone 5, as shown in FIG. 1, (using three cyclones, that is, the cyclones 4, 5 and 6) under the below-mentioned conditions:

Interior temperature of the cyclone 4—330° C.
Interior temperature of the cyclone 5—400° C.
Interior temperature of the cyclone 6—750° C.
Temperature of the hot gas in the combustion chamber 7—950° C.
Temperature of the rotary kiln-type reaction zone 13—750° C.
Amount of added sodium chloride—0.5% (by weight of said ore).
Amount of added coke—3.0% (by weight of said ore).

Thus obtained products were subjected to a conventional flotation process. The result was as follows:

Weight of recovered Cu-concentrate—6.2% (by weight of the fed-in ore).

Cu content: 52%, Cu recovery—92%.

Example 4

Copper oxide ore from South America (Au content: 3.5 g./t., Ag content: 22 g./t., Cu content: 5.4%), which was ground to a size of —35 mesh, was continuously fed into the hopper 41 of an apparatus as shown in FIG. 3 and subjected to treatment under the below-mentioned conditions:

Interior temperature of the cyclones 42 and 42'—360° C.
Interior temperature of the cyclone 45—550° C.
Interior temperature of the cyclones 46 and 46'—690° C.
Interior temperature of the cyclone 48—800° C.
Temperature of the combustion gas in the flue 49—1,000° C.
Interior temperature of the reaction zone 51—780–790° C.
Amount of chloridating agent (NaCl) added—0.8% (by weight of said ore fed in).
Amount of coke added—3% (by weight of said ore fed in).

When the products thus obtained were subjected to a conventional flotation process, the results were as follows:

Weight of recovered Cu-concentrate—8.5% (by weight of said ore fed in).

Analysis:
    Cu content: 58%, Cu recovery: 91%.
    Au content: 30 g./t., Au recovery: 73%.
    Ag content: 228 g./t., Ag recovery: 88%.

The embodiments of the invention in which an exclusive property or privilege is claimed are defined as follows:

1. In a method for segregating metals contained in metal oxide ore wherein the oxide ore is preheated in a preheating zone and the preheated ore is contacted with a halogenating agent and a reducing agent in a reaction zone to react therewith, the improvement which comprises, in the preheating zone, preheating all of the ore particles by mixing ore particles with hot combustion gas which is free of exhaust gas from the reaction zone to form ore-combustion gas mixture, flowing the ore-combustion gas mixture through at least two cyclones connected in series or in parallel, and in each cyclone continuously flowing the ore-combustion gas mixture in vortical flow through the cyclone to substantially separate the ore particles from the combustion gas whereby the ore particles are preheated by their contact with the hot combustion gas and then are separated therefrom, then continuously flowing the thus preheated ore particles into the reaction zone while substantially preventing the hot combustion gas from entering the reaction zone, and withdrawing the generated exhaust gas from the reaction zone and discharging same separately from the combustion gas fed to the preheating zone.

2. A method according to claim 1, in which in each cyclone the ore-combustion gas mixture flows downwardly through the cyclone, the preheated ore particles are removed from the bottom of the cyclone and the combustion gas is removed from the upper portion of the cyclone.

3. A method according to claim 1, wherein the temperature of the reaction zone is substantially the same as that of the preheating zone.

4. A method according to claim 1, wherein the preheating zone consists of 3 to 5 cyclones connected in series and the gas removed from each cyclone is mixed with the ore particles entering the next preceding cyclone in the series.

5. A method according to claim 1, wherein the preheating zone consists of 2, 4 or 6 stages, at least one of the stages consisting of at least two cyclones connected in parallel.

6. A method according to claim 1, in which in the reaction zone, the preheated ore particles, the halogenating agent and the reducing agent are tumbled and mixed together and are flowed axially through a rotary kiln.

7. A method according to claim 1, wherein harmful gases are removed from the exhaust gas by flowing same through a scrubbing tower.

8. A method according to claim 1, wherein the hot gas is produced by combustion of a fuel.

9. A method according to claim 1, in which the preheating zone consists of at least two stages, one of said stages consisting of at least two cyclones connected in parallel and the other stage consisting of a cyclone connected in series with the cyclones of said one stage, the gas removed from each stage being mixed with the ore particles entering the next preceding stage.

References Cited

UNITED STATES PATENTS

| | | | |
|---|---|---|---|
| 3,148,974 | 9/1964 | Rampacek | 75—72 |
| 3,186,833 | 6/1965 | Cech | 75—72 |
| 3,212,883 | 10/1965 | Cech | 75—72 |
| 3,300,299 | 1/1967 | Plint | 75—72 |

L. DEWAYNE RUTLEDGE, Primary Examiner

J. E. LEGRU, Assistant Examiner

U.S. Cl. X.R.

75—35